Feb. 11, 1941.  W. SOLLER  2,231,034
MULTIPLE FREQUENCY GENERATOR
Original Filed June 30, 1934  2 Sheets-Sheet 1
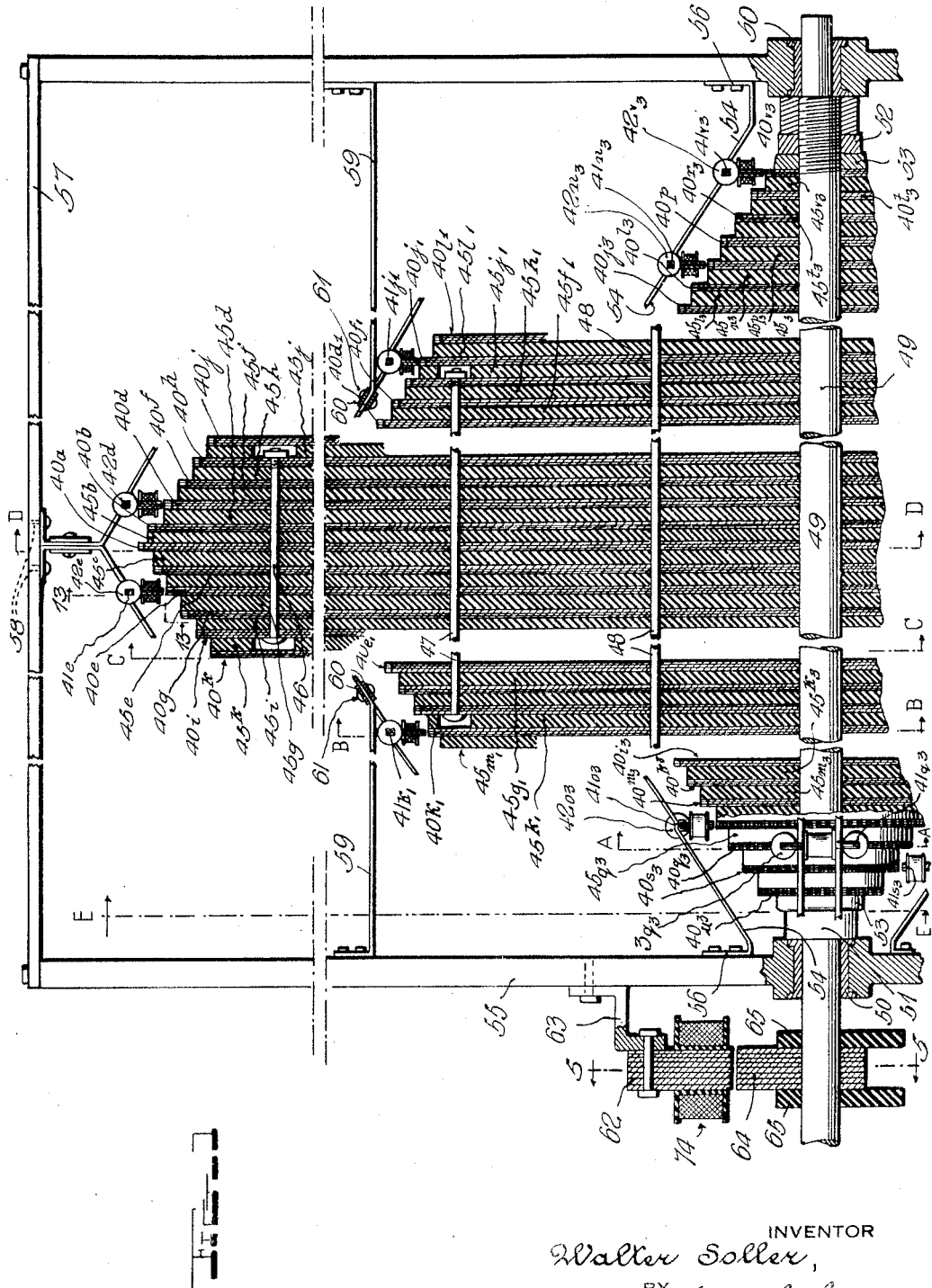
INVENTOR
Walter Soller,
BY John B. Brady
ATTORNEY

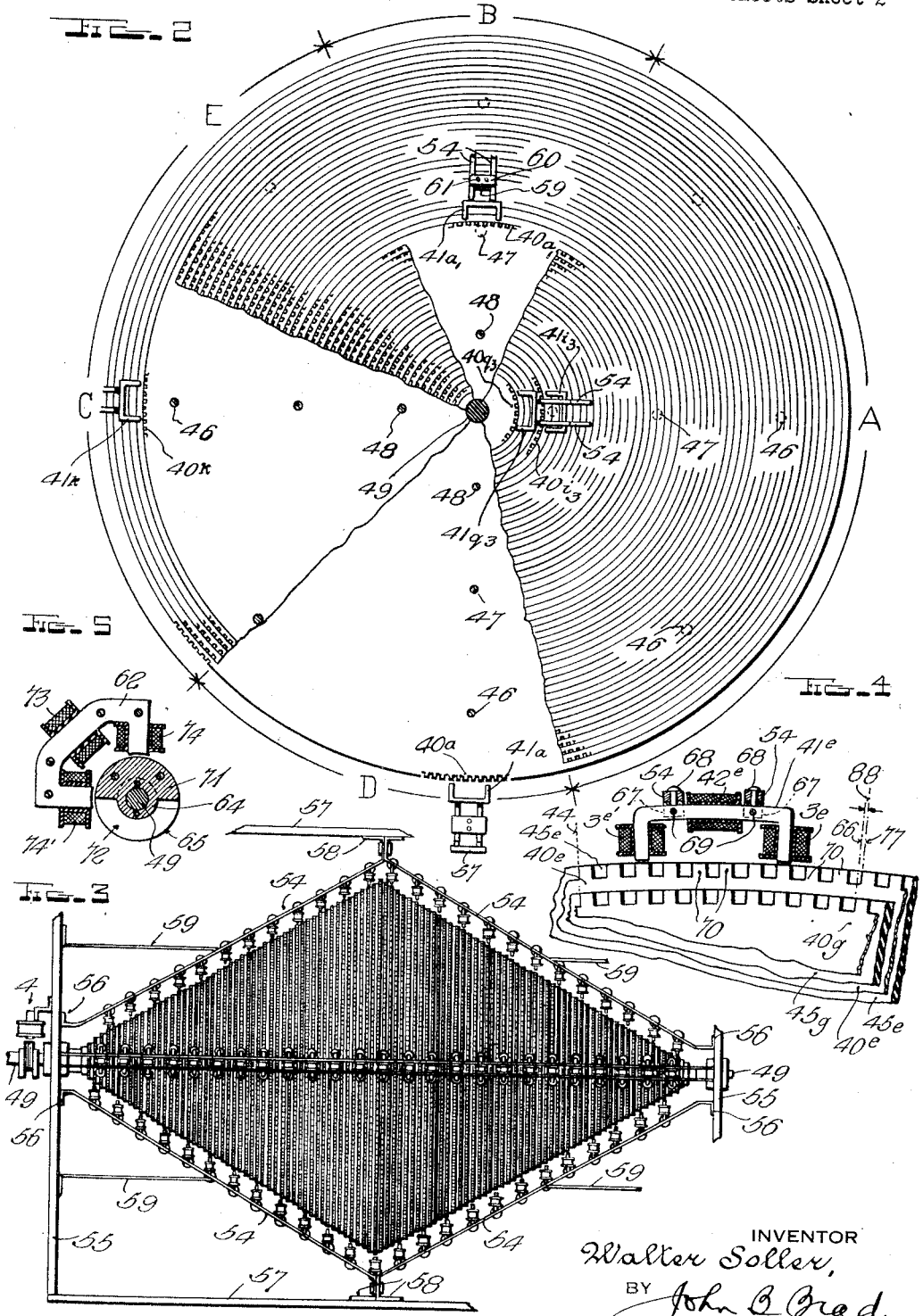

Patented Feb. 11, 1941

2,231,034

UNITED STATES PATENT OFFICE 2,231,034

MULTIPLE FREQUENCY GENERATOR

Walter Soller, Cincinnati, Ohio, assignor of one-half to William H. Woodin, Jr., Tucson, Ariz.

Original application June 30, 1934, Serial No. 733,300. Divided and this application February 2, 1939, Serial No. 254,302

6 Claims. (Cl. 171—252)

My invention relates broadly to electromechanical alternating current generators and more particularly to multiple frequency alternators for the generation of a plurality of currents of different frequencies.

This application is a division of my copending application Serial Number 733,300, filed June 30, 1934, renewed December 9, 1938, for Television system, and while the multiple frequency generator herein described is particularly adapted for cooperation in the television system of said copending application, the same may be employed in numerous other instances where a plurality of different frequency currents or a selection of currents of different frequency is required.

One of the objects of my invention is to provide a construction of alternator for generation of a plurality of different frequency currents for use as carriers and another current of a frequency suitable for operating a scanning system for a television transmitter.

Another object of my invention is to provide a compact structure of alternator for producing a large plurality of relatively high frequency currents.

A further object of my invention is to provide an inductor type alternator with electromagnetic stator and toothed rotor elements in multiple arrangement for the generation of a plurality of currents at relatively low voltage.

Still another object of my invention is to provide a construction of inductor type alternator for generating a plurality of currents of different frequencies in which the frequency relation of the currents is fixed and any or all of the currents may be employed as desired.

A still further object of my invention is to provide a construction of multiple frequency inductor type alternator having a stepped rotor of balanced form, with the section of largest diameter at the middle and sections of successively smaller diameter alternately disposed on opposite sides of the middle.

Other and further objects of my invention reside in the structure of multiple frequency alternator hereinafter set forth in detail, with reference to the accompanying drawings, in which:

Figure 1 is a vertical longitudinal view, partly in section and partly in elevation of the alternator of my invention; Fig. 2 is an end view partly in elevation, on line E—E and partly in section on lines A—A, B—B, C—C, and D—D of Fig. 1; Fig. 3 is a general elevational view of the assembled alternator; Fig. 4 is a detailed enlarged sectional view of one of the stator units taken on line 4—4 of Fig. 1; and Fig. 5 is a detailed sectional view on line 5—5 of Fig. 1.

The alternator of my invention is of the inductor type having all windings on stator elements and a toothed rotor for varying the reluctance of the magnetic path for correspondingly shifting the magnetic field and inducing voltages in the stator windings. The magnetic field is provided by separate windings on the stator elements.

Fig. 1 is a vertical longitudinal view, foreshortened on both axes, partly in section and partly in elevation, of a preferred construction of alternator for the generation of the several frequencies employed in accordance with my invention. Reference characters $40a$, $40b$, $40c$, etc., designate toothed, laminated iron rotor sections constituting means for varying the reluctance of the flux paths between the poles of the several laminated U-shaped stator cores, $41a$, $41b$, $41c$, etc. Magnetizing coils $42a$, $42b$, $42c$ etc., supplied with direct current produce a magnetic field across the pole pieces of the stator cores $41a$, $41b$, etc., which passes into and out of the rotor sections $40a$, $40b$, etc., respectively. Thus, as the rotor revolves and the tooth or space portions pass the pole tips, the magnetic field is varied. By magnetically cutting the wires in coils $3a$, $3a'$, $3b$, $3b'$; etc. mounted on the pole pieces of the stator cores $41a$, $41b$, etc., this magnetic field generates an alternating voltage in the coils of a frequency depending on the rate of variation of the magnetic field. Insulation spacers $45b$, $45c$, $45d$, etc., serve to support the teeth in the laminated rotor sections, to prevent jamming should one of the stator cores become misaligned and to separate the several magnetic fields to prevent interference therebetween.

The various sections are fastened together at different radii by bolts $46$, $47$ and $48$ and supported on shaft $49$ which is carried by bearings $50$. The sections are secured on shaft $49$ between collar $51$ and nut $52$ which is tightened to form a clamping fixture. Washers $53$ are provided to prevent injury to the end sections $40v_3$ and $40v_3$.

The various stator cores are disposed in a double conical spiral arrangement around the rotor as is better shown in Figs. 2 and 3. Supporting rods $54$ carry a number of the stator cores in fixed spacial relation to the rotor and are fastened at the ends to the side walls $55$ at $56$ and the transverse members $57$ at $58$. Supporting strips $59$ are clamped to rods $54$ by members $60$ and rivets $61$ and serve to brace the rods $54$ and to maintain the alignment of stator and rotor elements.

Fixed to the shaft 49 and separate from the multiple alternator assembly, is an individual generator 4 of somewhat higher rating as a unit, being of sufficient size to supply current to operate the synchronous motor to drive the scanning mechanism. This generator consists of a stator pole structure 62 mounted by bracket 63 to the side wall 55. The rotor member is comprised of a laminated iron section 64 of eccentric shape, for varying the reluctance of the magnetic path between the poles of the stator, and a pair of insulation members 65 fastened on either side of the laminated section 64 to counter-balance the eccentricity of the laminated section. The stator core carries a direct current magnetizing coil 73 and generating coils 74 and 74' in which an alternating voltage is induced by the variations in the magnetic field due to the rotation of the eccentric laminated rotor element 64, as is more clearly shown in Fig. 5.

Fig. 2 is a side elevation of the multiple alternator on line E—E of Fig. 1 and shows sections on lines A—A, B—B, C—C, and D—D of Fig. 1. The full elevation view on line E—E shows the stepped, concentric arrangement of the rotor sections to provide different linear speeds for the toothed peripheries of the various rotor sections. The section on line A—A shows the disposition of two representative stator cores $41i_3$ and $41q_3$ in their mutual relation and their relation to the rotor sections, $40i_3$ and $40q_3$. This relation provides on each set of supporting rods 54, a stator core assembly for every fourth rotor section. There are four such sets of supporting rods 54 disposed around the rotor and by proper selection of the initial pairing of stator and rotor elements, each rotor section will be provided with a corresponding stator assembly. This arrangement is more clearly shown in Fig. 3 in which, starting at the right of the illustration, the first rotor section has a corresponding stator supported by the upper rods 54, the second section has one supported by the front rods 54, the third has one supported by the lower rods 54, and the fourth has one supported by the rear rods 54, not visible in the drawings. The fifth section then will have a corresponding stator assembly supported on the upper rods 54 and so on for the whole of the structure. This separation and distribution insures magnetic distinction and facilitates construction.

The section on line B—B of Fig. 1, shown in Fig. 2, shows the stator core $41a_1$, as representative of the series of stator cores supported on the upper rods 54. This sectional view also shows the mounting of the bracing strip 59 clamped to rods 54 by members 60 to which it is secured by rivets 61.

The section on line C—C of Fig. 1, shown in Fig. 2, illustrates stator core $41k$ as representative of the series of stator cores supported on the left rods 54, which are the rear rods not visible in Fig. 3.

The section on line D—D of Fig. 1, shown in Fig. 2, shows the stator core $41a$ as representative of the cores supported by the lower rods 54. This sectional view also shows the lower transverse member 57 and the mounting of the rods 54 thereon.

The distribution of binding bolts 46, 47 and 48 is shown in Fig. 2.

Fig. 3 further shows the relation of the generator 4 to the multiple alternator assembly and the general relation of the reinforcing strips 59 to the supporting rods 54 and the side walls 55.

Fig. 4 is a detailed sectional view on line 4—4 in Fig. 1, through a representative stator core unit which includes the core $41e$, direct current magnetizing coil $42e$, and alternating current generating coils $3e$ and $3e'$. Supporting rods 54 are shown fixed to the core $41e$ by means of saddle straps 67 to which rods 54 are held by rivets 68 and which, in turn, are secured to core $41e$ by rivets 69.

Rotor section $40e$ having teeth 70 is aligned with the core $41e$ and backed by the insulating spacing member $45e$. The teeth are shown to be of an actual width of $\frac{1}{8}''$, in which case, for the curvature shown, there will be 161 teeth and 161 spaces in the circumference producing 161 cycles of flux change per revolution. If this machine is assumed to be rotating at 60 revolutions per second, the frequency generated in the coils $3e$ and $3e'$ will be $60 \times 161$ or 9660 cycles per second which would be suitable as a carrier for light modulations. To facilitate filtering and in order to minimize the band width required for a television transmission system employing multiple components, a difference of 60 cycles between subcarrier frequencies has been assumed as a workable medium difference. Thus, at 60 revolutions per second of the rotor structure, a difference of one tooth and one space per section will produce the desired difference in frequency of 60 cycles per second.

In order further to separate adjacent frequencies and to provide a balanced structure, the sections for adjacent frequencies are disposed on alternate sides of the center section which supplies the highest frequency. Thus, in Fig. 4 adjacent section $40g$ provides a frequency differing by 120 cycles from that provided by section $40e$. From the radius 44 at which the teeth in sections $40g$ and $40e$ are aligned, to the radii 66 and 77, the distance 88 on the circumference indicates the increasing difference which amounts to the width of two teeth and two spaces in the complete circumference. The example assumed has provision for 100 carrier frequencies and the scanning frequency. Thus, 101 toothed sections are provided, 100 of which form a multiple alternator unit. In designating the several sections, the alphabetical characters are employed through $a$ to $z$, $a_1$ to $z_1$, $a_2$ to $z_2$, and $a_3$ to $v_3$, making the total of 100 sections.

A frequency of 60 cycles per second is chosen for the scanning frequency. Alternator 4, shown in section in Fig. 5, is therefore provided with a rotor 64 having one tooth 71 and one space 72 producing one cycle per revolution, or 60 cycles per second at 60 revolutions per second. A synchronous motor having two poles, similar to the alternator, will revolve at 60 revolutions per second and effect 120 complete scannings every second which is more than sufficient number to maintain continuous vision. Core structure 62 of the alternator 4 carries direct current magnetizing coil 73 and alternating voltage generating coils 74 and 74'.

While I have described my invention in a certain preferred embodiment, I desire it understood that the principles disclosed may be adapted to various modifications of the structure illustrated, and that no limitations upon my invention are intended except as imposed by the scope of the appended claims.

What I claim as new and desire to secure by

Letters Patent of the United States is as follows:

1. An alternator assembly comprising a plurality of generator elements, each consisting of a stator unit and a rotor section, said rotor sections being separated by insulating spacer members, each of said rotor sections being formed of circular iron laminations having toothed circumferences, said toothed laminations providing when rotating a circuit of variable reluctance for the magnetic field of said stator unit, each of said rotor sections providing for a different rate of variation of the reluctance of the associated magnetic circuit, all of said rotor sections and insulating spacers mounted on a shaft to be rotated at constant speed, each of said stator units comprising a laminated core structure supporting electromagnetic windings and mounted for cooperation with one of said rotor sections, said stator units disposed in spiral arrangement about said rotor sections, the stator units coacting with adjacent rotor sections being disposed in angular displacement on the circumference of the composite rotor and effecting thereby alignment of a divisional part of said stator units, and insulating means for supporting said aligned stator units and fixed to transverse and vertical members in said alternator assembly.

2. An alternator assembly comprising a plurality of stator units and rotor sections, each of said stator units comprising a laminated core having pole pieces and supporting electromagnetic windings, one of said windings energized by direct current and producing a magnetic field across the poles of said core, a pair of said electromagnetic windings having a voltage generated across the terminals thereof when the strength of said magnetic field is varied, strap members embracing the laminations forming said core and fixed thereto, and insulating supporting rods fixed to said strap members and extending to support other stator units, said supporting rods being fixed to transverse and vertical members of said alternator assembly, said rotor sections formed to constitute means for individually varying the magnetic fields of said stator units at different frequencies for generating voltages of different frequencies in the said generating windings.

3. A synchronous generator comprising a rotor and a stator, said rotor consisting of magnetic laminations formed to produce a variable reluctance circuit for a magnetic field when rotated, said laminations mounted on a shaft and provided with insulating end members of similar shape but oppositely disposed and acting to counterbalance said laminated structure, said stator comprising a laminated magnetic core having pole pieces embracing an arc of less than the width of the magnetic material on the rotor circumference, said core structure supporting electromagnetic windings, one of said windings energized by direct current for producing a magnetic field across said pole pieces, others of said windings mounted on said pole pieces having a relatively low frequency voltage generated across the terminals thereof when said magnetic field is varied by rotation of said rotor structure; an alternator assembly for the generation of a plurality of currents of different relatively high frequencies having a composite rotor and a composite stator assembly; and means connected with the rotor of said synchronous generator and with the composite rotor of said alternator assembly for driving the said rotors in synchronism, whereby the frequency of the voltage produced in said synchronous generator is substantially equal to the speed of rotation of said alternator rotor assembly while the frequencies produced in said alternator assembly are substantial multiples of said speed of rotation, said synchronous-generator rotor and said alternator rotor being mounted on a common shaft.

4. An alternator assembly including a stepped rotor comprising toothed sections of different diameters rotatable for varying the reluctance of separate magnetic fields at different frequencies, the section of largest diameter being disposed at the middle of said rotor and sections of successively smaller diameters alternately disposed on opposite sides of said middle section; and individual stator inductor devices, each including a field winding and inductor windings, said inductor devices being arranged in spaced circumferential relation about said rotor and in cooperative relation with respect to the toothed rotor sections of different diameters, the inductor devices associated with adjacent rotor sections being substantially displaced circumferentially for magnetically isolating each of said inductor devices.

5. An alternator assembly including a stepped rotor comprising alternate magnetic and insulating layers, said magnetic layers having toothed peripheries for varying the reluctance of separate magnetic fields and of progressively different diameters for producing variations therein of different frequencies, the insulating layer at one side of each of said magnetic layers being of the same diameter as the toothed magnetic layer respectively; and individual stator inductor devices each including a field winding and inductor windings, said inductor devices being arranged in cooperative relation with respect to the several magnetic layers of said rotor, said insulating layers each providing a protective periphery of smooth contour adjacent the toothed periphery of the respective magnetic layer, the inductor devices cooperative with adjacent rotor sections being substantially displaced circumferentially of said rotor for magnetically isolating each of said inductor devices.

6. An alternator assembly as set forth in claim 5 wherein said stepped rotor has bolt members of different lengths extending therethrough at respectively different radii parallel to the axis of said rotor for maintaining said magnetic and insulating layers in intimately bound relation.

WALTER SOLLER.